(12) United States Patent
Allan et al.

(10) Patent No.: US 7,955,508 B2
(45) Date of Patent: Jun. 7, 2011

(54) SUPERCRITICAL FLUID BIOMASS CONVERSION SYSTEMS

(75) Inventors: Graham Allan, Kenmore, WA (US);
Thomas E. Loop, Seattle, WA (US);
James D. Flynn, Auburn, WA (US)

(73) Assignee: Xtrudx Technologies, Inc., Auburn, WA (US)

(*) Notice: Subject to any disclaimer, the term of this patent is extended or adjusted under 35 U.S.C. 154(b) by 106 days.

(21) Appl. No.: 12/402,489

(22) Filed: Mar. 11, 2009

(65) Prior Publication Data
US 2010/0063271 A1   Mar. 11, 2010

Related U.S. Application Data

(60) Provisional application No. 61/110,505, filed on Oct. 31, 2008, provisional application No. 61/035,380, filed on Mar. 11, 2008.

(51) Int. Cl.
*B01D 57/00* (2006.01)
*C10L 8/00* (2006.01)

(52) U.S. Cl. ............ 210/749; 44/307; 44/605; 210/761; 210/774; 210/806; 210/808; 422/198; 422/199; 422/208; 219/600; 219/618; 554/23

(58) Field of Classification Search .................. 210/175, 210/177, 180–182, 259, 511, 634, 639, 758–761; 210/774, 806, 749, 808; 44/605, 307, 308, 44/606; 422/138, 198, 199, 208, 602, 608, 422/618, 242; 219/600, 618, 628, 630, 635; 585/240, 241, 800, 802, 833–838; 71/11–13; 264/11–13, 454, 37.18; 554/8, 23
See application file for complete search history.

(56) References Cited

U.S. PATENT DOCUMENTS 4,237,226 A    12/1980   Grethlein
(Continued)

FOREIGN PATENT DOCUMENTS

CN   200610011584   10/2007
(Continued)

OTHER PUBLICATIONS

Masaru Watanabe, Hiroshi Inomata, Mitsumasa Osada, Takafumi Sato, Tadafumi Adschiri, and Kunio Arai "Catalytic effects of NaOH and ZrO2 for partial oxidative gasification of n-hexadecane and lignin in supercritical water" Fuel, vol. 82, Issue 5, Mar. 1, 2003, pp. 545-552.

(Continued)

*Primary Examiner* — Joseph W Drodge
(74) *Attorney, Agent, or Firm* — Thomas E. Loop; Graybeal Jackson LLP

(57) ABSTRACT

Disclosed herein are supercritical fluid biomass conversion machines, systems, and methods for converting a wide range of biomass materials into a plurality of reaction products including fermentable sugars and various aromatic substances. In one embodiment, a method is disclosed that comprises the steps of: providing an extruder; conveying a mixture of the selected biomass material and water through the extruder and into a supercritical fluid biomass conversion zone; heating and further pressurizing the mixture within the supercritical fluid biomass conversion zone to yield at least supercritical water, wherein heat energy is supplied by means of an induction heating coil positioned circumferentially about the supercritical fluid biomass conversion zone; retaining the mixture within the supercritical fluid biomass conversion zone for a period of time sufficient to yield the plurality of reaction products; and separating the plurality of reaction products into at least a water soluble fraction and an organic solvent soluble fraction.

5 Claims, 9 Drawing Sheets

U.S. PATENT DOCUMENTS

| | | | |
|---|---|---|---|
| 4,642,287 A | 2/1987 | Inoi et al. | |
| 4,744,926 A * | 5/1988 | Rice | 554/8 |
| 4,747,948 A | 5/1988 | North | |
| 4,849,554 A | 7/1989 | Cresswell et al. | |
| 5,216,149 A | 6/1993 | Evans et al. | |
| 5,278,282 A | 1/1994 | Nauman et al. | |
| 5,324,904 A | 6/1994 | Cresswell et al. | |
| 5,386,055 A * | 1/1995 | Lee et al. | 562/512.2 |
| 5,405,533 A * | 4/1995 | Hazlebeck et al. | 210/634 |
| 5,411,594 A | 5/1995 | Brelsford | |
| 5,558,783 A * | 9/1996 | McGuinness | 210/761 |
| 5,670,614 A * | 9/1997 | Roby et al. | 528/480 |
| 5,707,673 A * | 1/1998 | Prevost et al. | 426/417 |
| 6,083,409 A * | 7/2000 | Lin et al. | 210/758 |
| 6,090,595 A * | 7/2000 | Foody et al. | 435/99 |
| 6,107,532 A | 8/2000 | Saito et al. | |
| 6,180,845 B1 * | 1/2001 | Catallo et al. | 585/240 |
| 6,409,841 B1 | 6/2002 | Lombard | |
| 6,504,068 B1 | 1/2003 | Matsubara et al. | |
| 6,569,640 B1 | 5/2003 | Castor et al. | |
| 6,602,064 B1 | 8/2003 | Chen et al. | |
| 6,884,377 B1 | 4/2005 | Burnham et al. | |
| 6,966,874 B2 * | 11/2005 | Cornay et al. | 494/33 |
| 7,070,743 B2 | 7/2006 | Blackwell et al. | |
| 7,189,306 B2 | 3/2007 | Gervais | |
| 7,318,713 B2 | 1/2008 | Xu et al. | |
| 7,722,690 B2 | 5/2010 | Shires et al. | |
| 2002/0148575 A1 | 10/2002 | Wingerson | |
| 2004/0094144 A1* | 5/2004 | Ikegami et al. | 127/1 |
| 2005/0009935 A1* | 1/2005 | Mukaide et al. | 521/40.5 |
| 2005/0242464 A1* | 11/2005 | Goto et al. | 264/211.24 |
| 2006/0141584 A1 | 6/2006 | Litzen et al. | |
| 2006/0283995 A1 | 12/2006 | Wingerson | |
| 2007/0110837 A1* | 5/2007 | Goto et al. | 425/203 |
| 2007/0161095 A1* | 7/2007 | Gurin | 435/134 |
| 2008/0020437 A1 | 1/2008 | Savarese | |
| 2008/0196299 A1* | 8/2008 | Anitescu et al. | 44/308 |
| 2008/0229653 A1* | 9/2008 | Iversen et al. | 44/307 |

FOREIGN PATENT DOCUMENTS

| | | |
|---|---|---|
| CN | 200610011585 | 10/2007 |
| WO | PCT/EP2007/054378 A1 | 11/2007 |

OTHER PUBLICATIONS

Shiro Saka, Katsunobu Ehara, Seiya Sakaguchi, and Kei Yoshida "Useful Products from Lignocellulosics by Supercritical Water Technologies" delivered at the 2nd Joint International Conference on "Sustainable Energy and Environment (SEE 2006)" Nov. 1-23, 2006, Bangkok, Thailand. 5 pages.

Mitsumasa Osada, Takafumi Sato, Masaru Watanabe, Masayuki Shirai, and Kunioi Arai "Catalytic Gasification of Wood Biomass in Subcritical and Supercritical Water" Combustion Science and Technology in vol. 178, Nos. 1-3, No. 1-3/Jan. 2006 pp. 537-552.

Yukihiko Matsumura, Mitsuru Sasaki, Kazuhide Okuda, Seiichi Takami, Satoshi Ohara, Mitsuo Umetsu, and Tadafumi Adschiri "Supercritical Water Treatment of Biomass for Energy and Material Recovery" Combustion Science and Technology in vol. 178, Nos. 1-3, No. 1-3/Jan. 2006 pp. 509-536.

Z. Fang, T. Minowa, R.L. Smith, Jr., T. Ogi and J.A. Kozinski "Liquefaction and Gasification of Cellulose with Na2CO3 and Ni in Subcritical Water at 350° C" Ind. Eng. Chem. Res., 2004, 43 (10), pp. 2454-2463 Publication Date (Web): Apr. 16, 2004 (Article).

Ali Sinag, Andrea Kruse, and Jens Rathert "Influence of the Heating Rate and the Type of Catalyst on the Formation of Key Intermediates and on the Generation" of Gases During Hydropyrolysis of Glucose in Supercritical Water in a Batch Reactor Ind. Eng. Chem. Res., 2004, 43 (2), pp. 502-508 Publication Date (Web): Dec. 23, 2003 (Article).

A. Kruse, T. Henningsen, A. Sinag and J. Pfeiffer "Biomass Gasification in Supercritical Water: Influence of the Dry Matter Content and the Formation of Phenols" Ind. Eng. Chem. Res., 2003, 42 (16), pp. 3711-3717 Publication Date (Web): Jul. 11, 2003 (Article) DOI: 10.1021/ie0209430.

Takuya Yoshida, Yoshito Oshima, and Yukihiko Matsumura "Gasification of biomass model compounds and real biomass in supercritical water" Biomass and Bioenergy, vol. 26, Issue 1, Jan. 2004, pp. 71-78.

A. Kruse and A. Gawlik "Biomass Conversion in Water at 330-410° C and 30-50 MPa. Identification of Key Compounds for Indicating Different Chemical Reaction Pathways" Ind. Eng. Chem. Res., 2003, 42 (2), pp. 267-279 Publication Date (Web): Dec. 18, 2002 (Article).

B. Potic, L. Van De Beld, D. Assink, W. Prins and W.P.M. Van Swaaij "Gasification of Biomass in Supercritical Water" paper University of Twente, Faculty of Chemical Technology circa 2006.

Katsunobu Ehara, Shiro Saka, and Haruo Kawamoto "Characterization of the Lignin-derived Products from Wood as Treated in Supercritical Water" J Wood Sci (2002) vol. 48 No. 1 pp. 320-325.

Mitsuru Sasaki, Momoko Furukawa, Kimitaka Minami, Tadafumi Adschiri, and Kunio Arai "Kinetics and Mechanism of Cellobiose Hydrolysis and Retro-Aldol Condensation in Subcritical and Supercritical Water" Ind. Eng. Chem. Res., 2002, 41 (26), pp. 6642-6649 Publication Date (Web): Nov. 19, 2002 (Article).

Takuya Yoshida and Yukihiko Matsumura "Gasification of Cellulose, Xylan, and Lignin Mixtures in Supercritical Water" Ind. Eng. Chem. Res., 2001, 40 (23), pp. 5469-5474 Publication Date (Web): Oct. 18, 2001 (Article) DOI: 10.1021/ie0101590.

K. Ehara, S. Saka and H. Kawamoto "Chemical Conversion of Woody Biomass by Supercritical Water—Degradation of Lignin—" 12th European Conference on Biomass for energy, Industry and Climate Protection, Jun. 17-21, 2002, Amsterdam, The Netherlands, (2002) pp. 805-808.

Andrea Kruse, Danny Meier, Pia Rimbrecht, and Michael Schacht "Gasification of Pyrocatechol in Supercritical Water in the Presence of Potassium Hydroxide" Ind. Eng. Chem. Res., 2000, 39 (12), pp. 4842-4848 Publication Date (Web): Nov. 16, 2000 (Article) DOI: 10.1021/ie0001570.

Michael Jerry Antal, Jr., Stephen Glen Allen, Deborah Schulman, and Xiaodong Xu, Robert J. Divilio "Biomass Gasification in Supercritical Water" Ind. Eng. Chem. Res., 2000, 39 (11), pp. 4040-4053 Publication Date (Web): Oct. 14, 2000 (Article).

Hiroki Ando, Tsuyoshi Sakaki, Tetsuro Kokusho, Masao Shibata, Yoshimitsu Uemura, and Yasuo Hatate "Decomposition Behavior of Plant Biomass in Hot-Compressed Water" Ind. Eng. Chem. Res., 2000, 39 (10), pp. 3688-3693 Publication Date (Web): Aug. 23, 2000 (Article).

Mitsuru Sasaki, Zhen Fang, Yoshiko Fukushima, Tadafumi Adschiri, and Kunio Arai "Dissolution and Hydrolysis of Cellulose in Subcritical and Supercritical Water" Ind. Eng. Chem. Res., 2000, 39 (8), pp. 2883-2890 Publication Date (Web): Aug. 7, 2000 (Article) DOI: 10.1021/ie990690j.

Phillip E. Savage "Organic Chemical Reactions in Supercritical Water" University of Michigan, Chemical Engineering Department, Ann Arbor, Michigan 48109-2136 Chem. Rev., 1999, 99 (2), pp. 603-622 DOI: 10.1021/cr9700989 Publication Date (Web): Jan. 5, 1999.

Shiro Saka and Tomonori Ueno "Chemical conversion of various celluloses to glucose and its derivatives in supercritical water" Cellulose, vol. 6, No. 3, Sep. 1999, pp. 177-191(15) Publisher: Springer.

B.M. Kabyemela, M. Takigawa, T. Adschiri, R.M. Malaluan, and K. Arai "Mechanism and Kinetics of Cellobiose Decomposition in Sub- and Supercritical Water" Ind. Eng. Chem. Res., 1998, 37 (2), pp. 357-361 Publication Date (Web): Jan. 9, 1998 (Article) DOI: 10.1021/ie9704408.

Misuru Sasaki, Bernard Kabyemela, Roberto Malaluan, Satoshi Hirose, Naoko Takeda, Tadafumi Adschiri, and Kunio Arai "Cellulose hydrolysis in subcritical and supercritical water" The Journal of Supercritical Fluids vol. 13 Issues 1-3, pp. 261-268 (1998).

Bernard M. Kabyemela, Tadafumi Adschiri, Roberto Malaluan, and Kunio Arai "Degradation Kinetics of Dihydroxyacetone and Glyceraldehyde in Subcritical and Supercritical Water" Ind. Eng. Chem. Res., 1997, 36 (6), pp. 2025-2030 Publication Date (Web): Jun. 2, 1997 (Article) DOI: 10.1021/ie960747r.

Bernard M. Kabyemela, Tadafumi Adschiri, Roberto M. Malaluan, Kunio Arai, and Hiroshi Ohzeki "Rapid and Selective Conversion of Glucose to Erythrose in Supercritical Water" Ind. Eng. Chem. Res., 1997, 36 (12), pp. 5063-5067 Publication Date (Web): Dec. 1, 1997 (Article).

Bernard M. Kabyemela, Tadafumi Adschiri, Roberto Malaluan, and Kunio Arai "Kinetics of Glucose Epimerization and Decomposition in Subcritical and Supercritical Water" Ind. Eng. Chem. Res., 1997, 36 (5), pp. 1552-1558 Publication Date (Web): May 5, 1997 (Article) DOI: 10.1021/ie960250h.

Xiaodong Xu, Yukihiko Matsumura, Jonny Stenberg, and Michael Jerry Antal, Jr. "Carbon-Catalyzed Gasification of Organic Feedstocks in Supercritical Water" Ind. Eng. Chem. Res., 1996, 35 (8), pp. 2522-2530 Publication Date (Web): Aug. 8, 1996 (Article) DOI: 10.1021/ie950672b.

Phillip E. Savage, Sudhama Gopalan, Tahmid I. Mizan, Christopher J. Martino, and Eric E. Brock. "Reactions at Supercritical Conditions: Applications and Fundamentals" AIChE Journal Jul. 1995 vol. 41, No. 7 p. 1723-1778.

Douglas C. Elliot, M.R. Phelps, L. John Sealock Jr., and Eddie G. Baker "Chemical Processing in High-Pressure Aqueous Environments. 4. Continuous-Flow Reactor Process Development Experiments for Organics Destruction" Ind. Eng. Chem. Res., 1994, 33 (3), pp. 566-574 Publication Date: Mar. 1994 ().

Douglas C. Elliot, L. John Sealock Jr., and Eddie G. Baker "Chemical processing in high-pressure aqueous environments. 2. Development of catalysts for gasification" Ind. Eng. Chem. Res., 1993, 32 (8), pp. 1542-1548 Publication Date: Aug. 1993 (Article) DOI: 10.1021/ie00020a002.

K. Ehara and S. Saka "Chemical Conversion of Cellulose by Batch-Type and Flow-Type Supercritical Water Systems" 12th European Conference on Biomass for energy, Industry and Climate Protection, Jun. 17-21, 2002, Amsterdam, The Netherlands, (2002) pp. 801-804.

Mitch Jacoby "Chemicals from the Garden" Chemical & Engineering News, Jul. 6, 2009 vol. 87, No. 27 p. 10 p. 26-28.

Tao Xiang and Keith P. Johnston "Acid-Base of Behavior of Organic Compounds in Supercritical Water" The Journal of Physical Chemistry, Publication Date (Web) May 1, 2002.

Gerald E. Bennett and Keith P. Johnston "UV-visible absorbance spectroscopy of organic probes in supercritical water" The Journal of Physical Chemistry, Publication Date (Web) May 1, 2002.

Christine J. Wu, Laurence E. Fried, Lin H. Yang, Nir Goldman and Sorin Bastea "Catalytic behaviour of dense hot water" Nature Chemistry Vol. 1, Apr. 2009 published online: Mar. 19, 2009.

M. Goto, M. Sasaki, T. Hirose "Reactions of polymers in supercritical fluids for chemical recycling of waste plastics" Journals of Materials Science vol. 41 No. 5, Mar. 2006 p. 1509-1515.

* cited by examiner

SUPERCRITICAL FLUID BIOMASS CONVERSION SYSTEMS

CROSS-REFERENCE TO RELATED APPLICATIONS

This application claims the benefit of U.S. Provisional Application No. 61/035,380 filed on Mar. 11, 2008, and U.S. Provisional Application No. 61/110,505 filed on Oct. 31, 2008, which applications are incorporated herein by reference in their entireties for all purposes.

TECHNICAL FIELD

The present invention relates generally to biomass conversion systems and, more specifically, to biomass conversion systems and related methods that utilize supercritical fluids to transform a biomass feedstock's main polysaccharide components (cellulose and hemicellulose) into one or more fermentable sugars, and the main polyphenolic components into one or more simple aromatic compounds.

BACKGROUND OF THE INVENTION

Everyday the Sun pours down onto the Earth a vast quantity of radiant energy many many times greater than the total now used by Man. Some of this energy, together with carbon dioxide and water, Nature traps in trees and other plants by conversion into giant chemical molecules, collectively called biomass. The major components (about 60% to 80%) of this mixture are polysaccharides. These are long and substantially linear chains, the individual links of which are simple sugars. The remaining component (about 15% to 25%) is called lignin and is a complex network of joined aromatic rings of the type present in diesel engine fuel. The energy trapped within plants can be recovered, in part, by breaking down the long chains into their constituent sugar links for subsequent standard fermentation into bioethanol. In contrast, the breakdown of the lignin network can yield simple aromatic compounds for possible direct incorporation into diesel fuel. The problem facing chemical engineers has been how to achieve these demonstrated chemical breakdowns on a large-scale, commercially practical, and energy efficient way.

There exists immense amounts of biomass materials in forests and crops, and cellulose, the main component, is one of the most abundant natural resources available on the Earth. In this regard, natural cellulosic feedstocks are now commonly referred to as "biomass," and biomass materials are known to generally consist primarily of cellulose (~40% to ~50%), hemicellulose (~20% to ~30%), and lignin (~15% to ~25%) bound together in a complex structure together with smaller amounts of pectins, proteins, and ash. Many types of biomass, including, for example, wood, paper, agricultural residues such as bagasse, switchgrass, wheat or sorghum straw, corn husks, and the like have long been considered as possible feedstocks for the manufacture of certain organic chemicals, but thus far existing biomass conversion technologies have achieved only limited success. It is believed by many that due to the complex chemical structure of most biomass materials, microorganisms and enzymes cannot effectively attack the cellulose component without prior treatment. Indeed, conventional methods for converting cellulose to glucose by way of acid hydrolysis and enzymatic saccharification are known to be inefficient and, consequently, are not yet commercially viable.

More recently, however, the chemical conversion of cellulose with supercritical water to obtain various sugars has been studied. (see, e.g., M. Sasaki, B. Kabyemela, R. Malaluan, S. Hirose, N. Takeda, T. Adschiri & K. Arai, Cellulose hydrolysis in subcritical and supercritical water, *J. Supercritical Fluids*, 13, 261-268 (1998); S. Saki & T. Ueno, Chemical conversion of various celluloses to glucose and its derivatives in supercritical water, *Cellulose*, 6, 177-191 (1999).) These more recent studies are among the first to demonstrate that cellulose may be rapidly hydrolyzed in supercritical water to yield glucose (in high yield) in either flow or batch type micro-reactors. The use of flow or batch type micro-reactors, however, is not a realistic option for the commercial-scale production of cellulosic based motor fuels.

Accordingly, and although some progress has made with respect to the development of biomass conversion systems, there is still a need in the art for new and improved machines, systems, and methods for converting biomass into simple sugars and aromatic chemicals which, in turn, can be readily converted into cellulosic based motor fuels. The present invention fulfills these needs and provides for further related advantages.

SUMMARY OF THE INVENTION

The present invention is directed to supercritical fluid biomass conversion machines, systems, and methods for converting biomass materials into a plurality of reaction products including fermentable sugars and various aromatic compounds that, in turn, can be converted into "cellulo-ethanol" and "ligno-diesel," respectively. In one embodiment, the present invention is directed to a "static" biomass conversion system for converting a selected biomass material into a plurality of reaction products, and comprises: a biomass conversion zone within a housing having a central axis; and an electromagnetic induction heating system in an operative relationship with the biomass conversion zone. Unlike biomass conversion systems known in the art, the present invention may be characterized in that it further comprises a centralized induction heating system. The centralized electromagnetic induction heating system of the present invention comprises an alternating current power supply electrically connected to an induction coil, and the induction coil is positioned circumferentially about the central axis of the housing. In this configuration, the induction coil, when energized, passes an alternating electrical current that simultaneously generates a transverse alternating magnetic field—a transverse alternating magnetic field that induces eddy currents and heating within the metallic housing that surrounds the biomass conversion zone (and possibly enhances the rapid cleavage and depolymerization of various giant biomass molecules into their more fundamental simple sugars and aromatic compound chemical building blocks).

In another embodiment, the present invention is directed to a "dynamic" supercritical fluid biomass conversion system for continuously converting a selected biomass material into a plurality of reaction products, and comprises, in fluidic series: a biomass conveying zone; a supercritical fluid biomass conversion zone within an electrically conductive housing and about a central axis; and a reaction product quenching/separation zone. This embodiment may also be characterized in that it further comprises a centralized induction heating system, which system includes an alternating current power supply electrically connected to an induction coil. The induction coil is circumferentially positioned about the central axis, as well as the electrically conductive housing of the supercritical fluid biomass conversion zone. In this configuration, the induction coil, when energized, passes an alternating electrical current that simultaneously generates a transverse alternating magnetic field.

In yet another embodiment, the selected biomass material is mixed together with water and a plurality of electrically conductive particles such as, for example, graphite or coal particles, and this admixture is then flowingly conveyed through the supercritical fluid biomass conversion zone while the induction coil is energized such that the plurality of electrically conductive particles are inductively heated (as a result of passing through the alternating magnetic field that has been created within the supercritical fluid biomass conversion zone), thereby enhancing and/or otherwise facilitating heat transfer and chemical reactions occurring within the supercritical fluid biomass conversion zone.

In a still further embodiment, the present invention is directed to a composition of matter that consists essentially of a mixture of a biomass material, water, and a plurality of electrically conductive particles (capable of being inductively heated when under the influence of an alternating magnetic field), wherein the water component of the mixture is at supercritical conditions.

In a still further embodiment, the present invention is directed to an extruder-based supercritical fluid biomass conversion machine especially configured for converting raw biomass materials such as, for example, wood chips, agricultural residue and the like into a plurality of reaction products, and comprises, in fluidic series: an elongated extruder-based biomass conveying zone; a supercritical fluid biomass conversion zone; and a reaction product quenching/separation zone. This embodiment may be characterized in that the elongated biomass conveying zone contains two or more elongated rotatable shafts having a plurality of flighted screws positioned lengthwise within an elongated conveying section housing (thereby defining an extruder). The plurality of flighted screws are positioned about each respective two or more elongated rotatable shafts, and the two or more elongated rotatable shafts are configured to continuously convey the selected biomass material from an upstream biomass inlet to the supercritical fluid biomass conversion zone while increasing the pressure of the selected biomass material from about atmospheric at the biomass inlet to greater than about 22.1 MPa at the supercritical fluid biomass conversion zone.

These and other aspects of the present invention will become more evident upon reference to the following detailed description and accompanying drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain exemplary embodiments of the present invention and as such they are not necessarily drawn to scale. In addition, it is to be expressly understood that the relative dimensions and distances depicted in the drawings (and described in the "Detailed Description of the Invention" section) are exemplary and may be varied in numerous ways. Finally, like reference numerals have been used to designate like features throughout the several views of the drawings.

DETAILED DESCRIPTION OF INVENTION

Figure 1A:
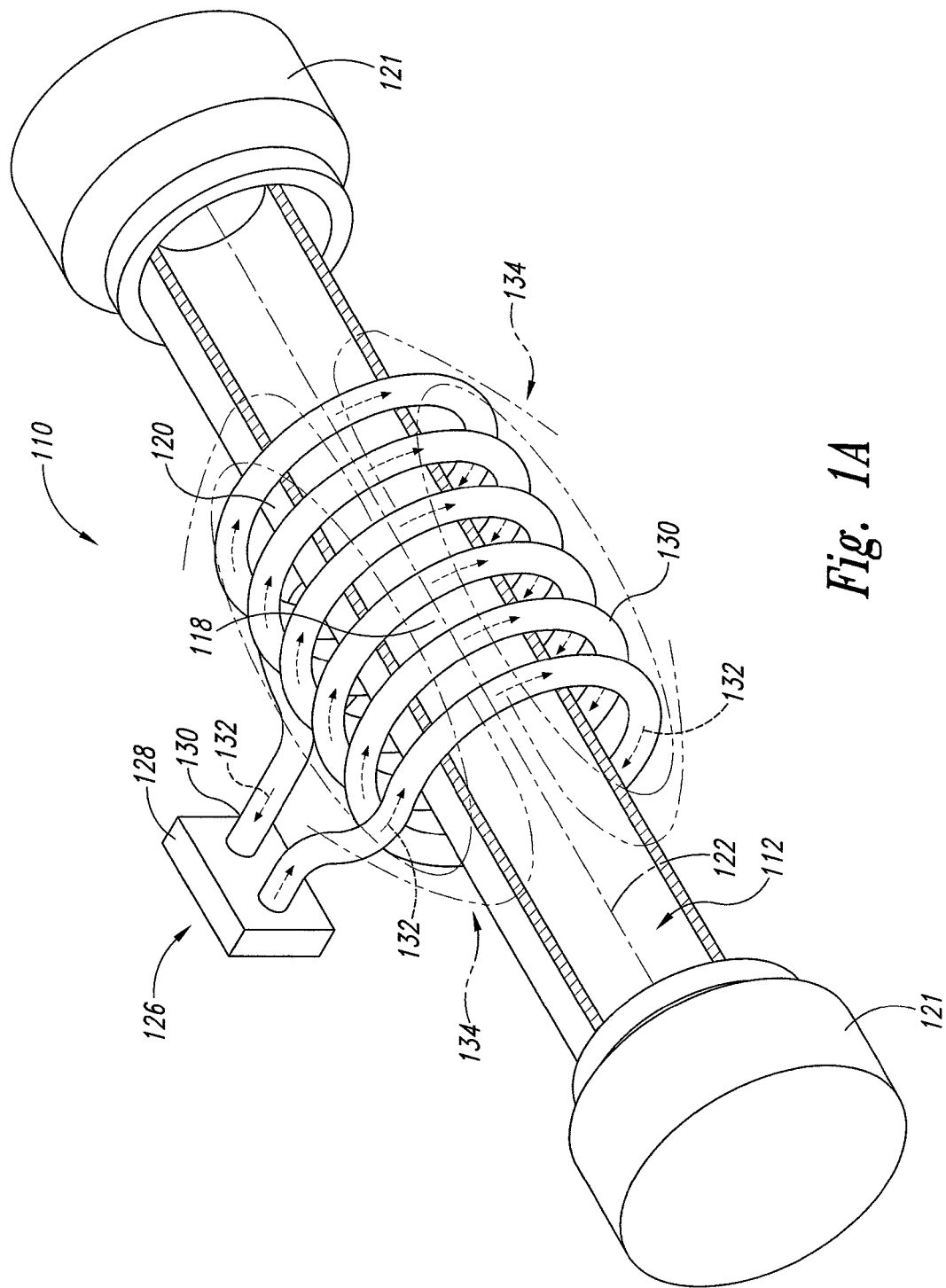
FIG. 1A shows a side perspective view of a "static" supercritical fluid biomass conversion system in accordance with an embodiment of the present invention, wherein an alternating electrical current is passing through an induction coil so as to generate a transverse alternating magnetic field.
Figure 1B:
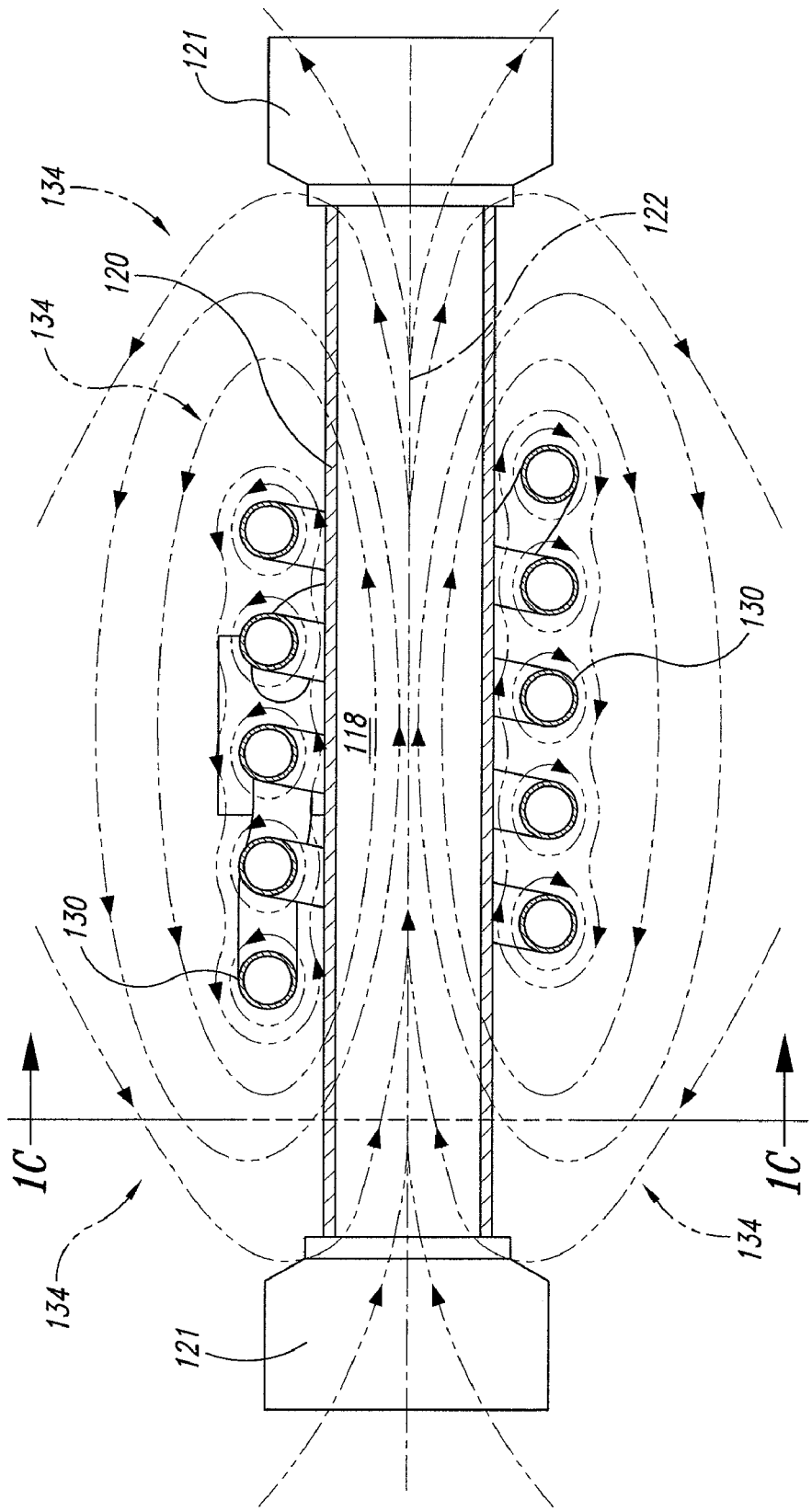
FIG. 1B shows a side cross-sectional view of the supercritical fluid biomass conversion system shown in FIG. 1A.
Figure 1C:
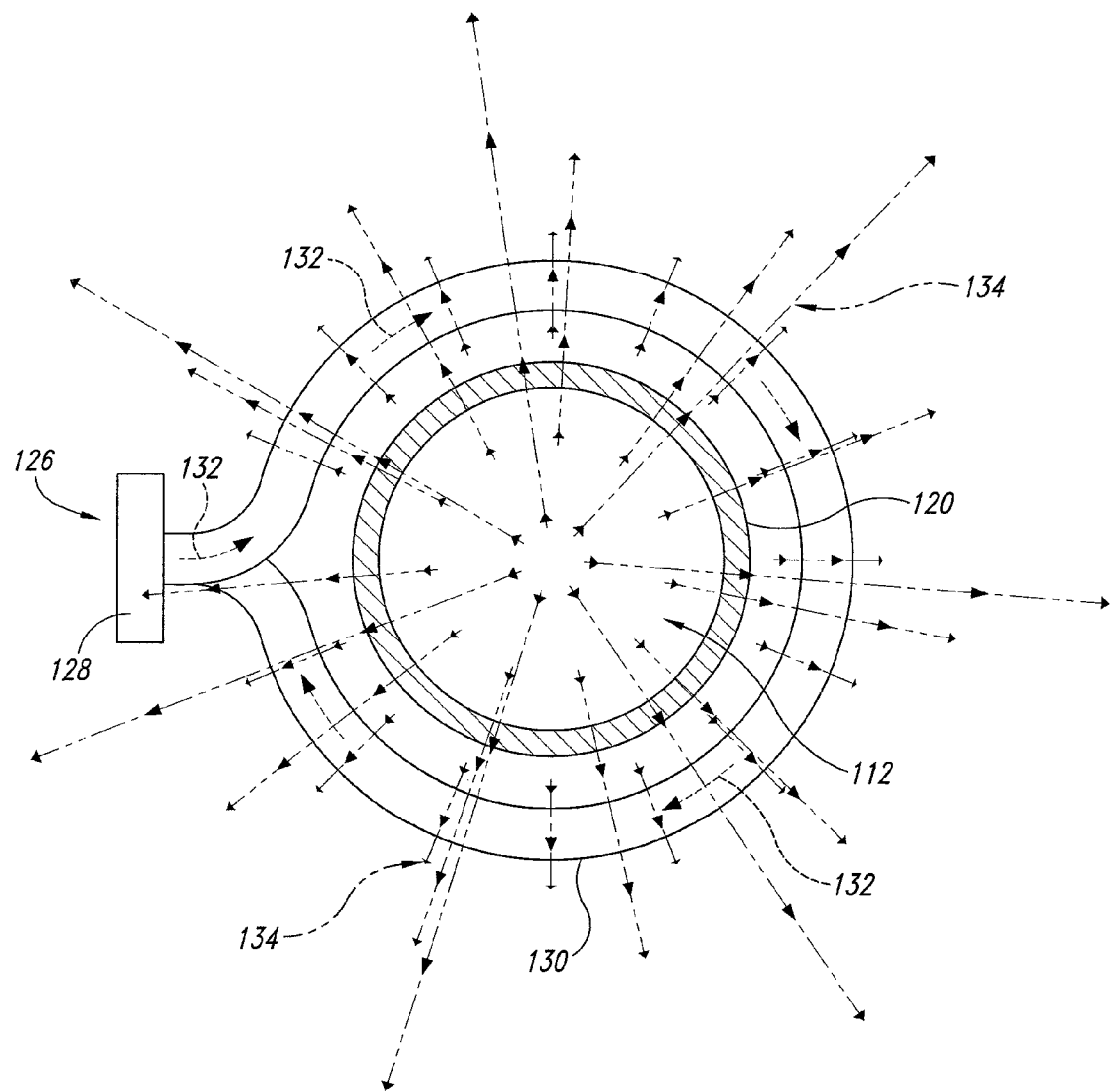
FIG. 1C shows an end view of the supercritical fluid biomass conversion system shown in FIGS. 1A and 1B.

Referring now to the drawings where like numerals have been used to designate like features throughout the several views, and more specifically to FIGS. 1A-C, the present invention in a first embodiment is directed to a "static" supercritical fluid biomass conversion system 110 for converting a selected biomass material 112 into a plurality of reaction products (not shown). In the context of the present invention, the term "biomass" means any plant derived organic matter, including dedicated energy crops and trees, agricultural food and feed crops, agricultural crop wastes and residues, wood wastes and residues, aquatic plants, algae, animal wastes, municipal wastes, and other like organic materials. As shown, the biomass conversion system 110 comprises: a biomass conversion zone 118 within a housing 120 having a central axis 122 (all of which define a biomass reactor 223 as best shown separately in FIGS. 2A-C); and a centralized electromagnetic induction heating system 126 in an operative relationship with the housing 120 and the biomass conversion zone 118. The housing 120 is preferably tubular (e.g., cylindrical) in shape and includes a pair of threaded end caps 121 connected at each end, thereby ensuring that the biomass conversion zone 118 is sealed from the outside environment. The end caps 121 may each include a central through-hole (not shown) that allows for placement of temperature and pressure sensors within the biomass conversion zone 118. For reasons that will become more apparent in view of the further embodiments of the present invention set forth below, the housing 120 may be made of an electrically conductive metal (e.g., stainless steel), and/or an electrically nonconductive material (e.g., a glass or ceramic material) that is substantially transparent to alternating magnetic fields and other irradiation sources like, for example, gamma rays, electron beams, and microwaves.

Figure 2A:
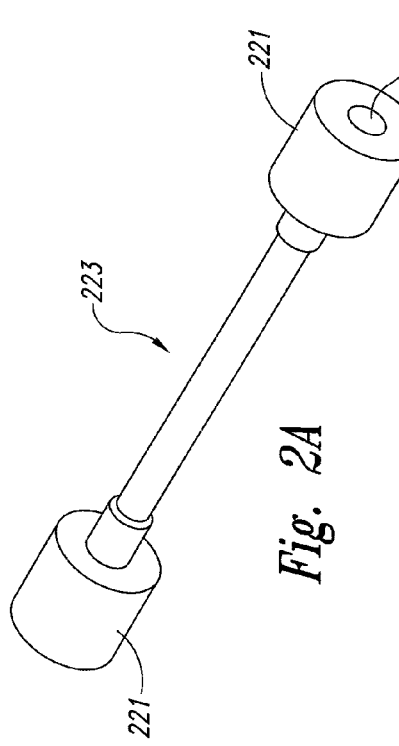
FIGS. 2A-C show various views of a supercritical fluid biomass conversion reactor in accordance with an embodiment of the present invention.
Figure 2B:
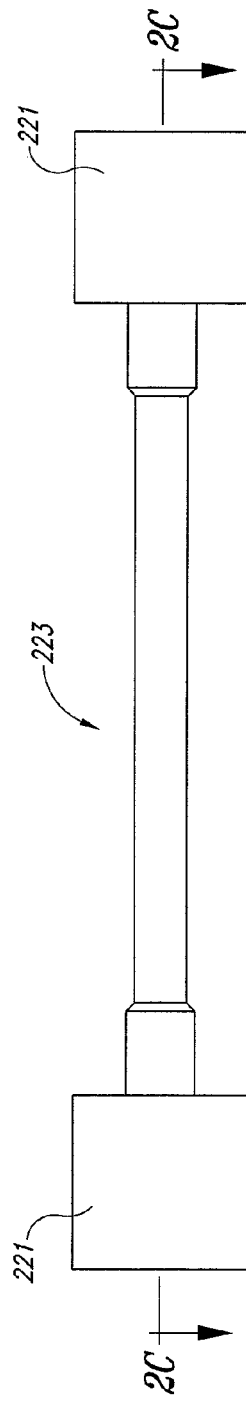
Figure 2C:
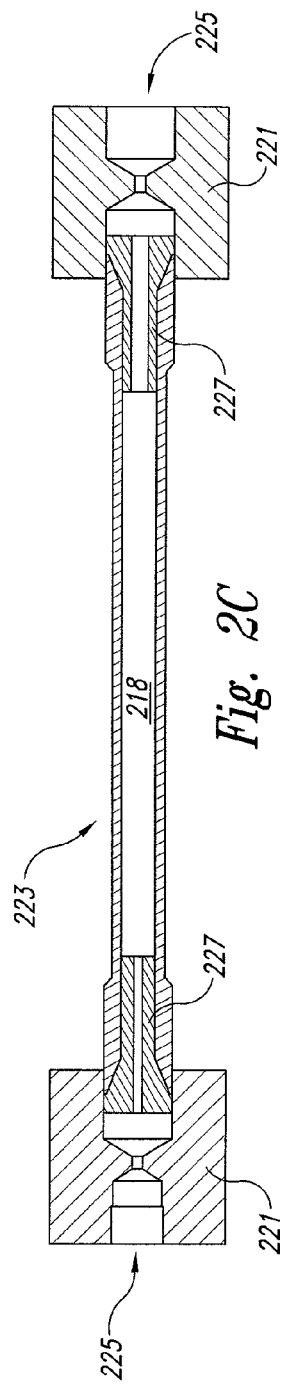

As best shown in FIGS. 2A-C, the biomass reactor 223 in an embodiment comprises a cylindrical stainless steel tube having a pair of threaded ends caps 221 threadedly engaged about the end portions of the tube. The end caps 221 each include a central through-hole 225 that allows for placement of temperature and pressure sensors within a biomass conversion zone 218 defined by the inner volume of the tube. To this end, the biomass reactor 223 further comprises a pair of snuggly fitting ferrules 227 positioned at and within the end portions of the tube. In this configuration, the ferrules 227 allow for the proper and secure placement of respective temperature and pressure sensing probes (not shown) within the biomass conversion zone 228.

The biomass conversion zone 218 associated with the biomass reactor 223 is preferably completely filled with a selected water laden biomass material that is substantially devoid of air. In this regard, the water content of the selected water laden biomass preferably ranges from (1) at least 15%, (2) about 20% to about 50%, or (3) about 10% to about 90% by weight. Rapid heating of the sealed reactor causes the water laden biomass material to gain energy, which concomitantly results in increased temperature and pressure within the biomass conversion zone 218. Indeed, it is preferable to heat the water laden biomass material that occupies the biomass conversion zone 218 to a temperature of at least 374.4° C. (thereby also increasing the pressure within the biomass conversion zone 218 to well over 218 atm), and for a period of time that preferably ranges from about 0.4 to about 10 seconds. In so doing, and without necessarily prescribing to any particular scientific theory, it is believed that at these conditions the water component is at a supercritical state, thereby enabling the rapid hydrolysis and depolymerization of the surrounding biomass's main polysaccharide components (cellulose and hemicellulose) into one or more fermentable sugars, and the main polyphenolic components into one or more simple aromatic compounds. In addition, a phenolic compound may be added to the water laden biomass material to retard the formation of certain degradation reaction products.

As best shown in FIGS. 1A-C, the centralized electromagnetic induction heating system 126 component comprises an alternating current power supply 128 electrically connected to a helically-shaped induction coil 130, and the induction coil 130 is positioned circumferentially about the central axis 122 of the housing 120. In this configuration, the induction coil 130, when energized, passes an alternating electrical current 132 that, in turn, simultaneously generates a transverse alternating magnetic field 134. As further shown, the transverse alternating magnetic field 134 penetrates and resides within at least a portion of the biomass conversion zone 118. Without necessarily prescribing to any particular scientific theory, it is believed that the presence of the alternating magnetic field 134 within the conversion zone 118 enhances and/or otherwise facilitates the rapid cleavage and reaction of various giant biomass molecules into more fundamental chemical building blocks (such as, for example, simple sugars and various aromatic compounds).

Unlike conventional heating systems based on convective heat transfer principles, induction heating is generally considered to be a complex combination of electromagnetic, heat transfer, and metallurgical phenomena. In this regard, an alternating voltage applied to an induction coil (e.g., solenoid coil) in accordance with the present invention results in an alternating current in the coil circuit. The generated alternating coil current will, in turn, produce in its surroundings a time-variable magnetic field that has the same frequency as the coil current. This magnetic field induces eddy currents in the workpiece located inside the coil. Eddy currents will also be induced in other electrically conductive objects that are located near the coil. These induced currents have the same frequency as the coil current; however, their direction is opposite to the coil current. These currents produce heat by way of the Joule effect ($I^2R$), which is a physical law expressing the relationship between the heat generated by the current flowing through a conductor.

Stated somewhat differently, in induction heating a source of high frequency electricity is used to drive a large alternating current through a coil. This coil is known as the work coil. The passage of current through this coil generates a very intense and rapidly changing magnetic field in the space surrounding and within the work coil. The workpiece to be heated (i.e., metallic tubular reactor filled with water laden biomass) is placed within this intense alternating magnetic field. The alternating magnetic field induces a current flow in the conductive workpiece. The arrangement of the work coil and the workpiece can be thought of as an electrical transformer. The work coil is like the primary where electrical energy is fed in, and the workpiece is like a single turn secondary that is short-circuited. This arrangement causes tremendous currents to flow through the workpiece. These currents are known as eddy currents. In addition, the high frequency alternating electrical current used in induction heating gives rise to a phenomenon referred to as the "skin effect." This skin effect forces the alternating current to flow in a thin layer near the surface of the workpiece. The skin effect increases the effective resistance of the metal to the passage of the large current, thereby further increasing the heating effect.

For ferrous metals like iron and some types of steel, there is an additional heating mechanism that takes place at the same time as the eddy currents mentioned above. In this regard, the intense alternating magnetic field inside the work coil repeatedly magnetises and de-magnetises the iron crystals of the metallic workpiece. This rapid flipping of the magnetic domains causes considerable friction and heating inside the metal material (i.e., metallic tubular reactor filled with water laden biomass). Heating due to this mechanism is known as Hysteresis loss, and is greatest for materials that have a large area inside their B-H curve. This can be a large contributing factor to the heat generated during induction heating, but only takes place inside ferrous materials. For this reason ferrous materials lend themselves more easily to heating by induction than non-ferrous materials. It is interesting to note that steel loses its magnetic properties when heated above approximately 700° C., which temperature is known as the Curie temperature.

Figure 3A:
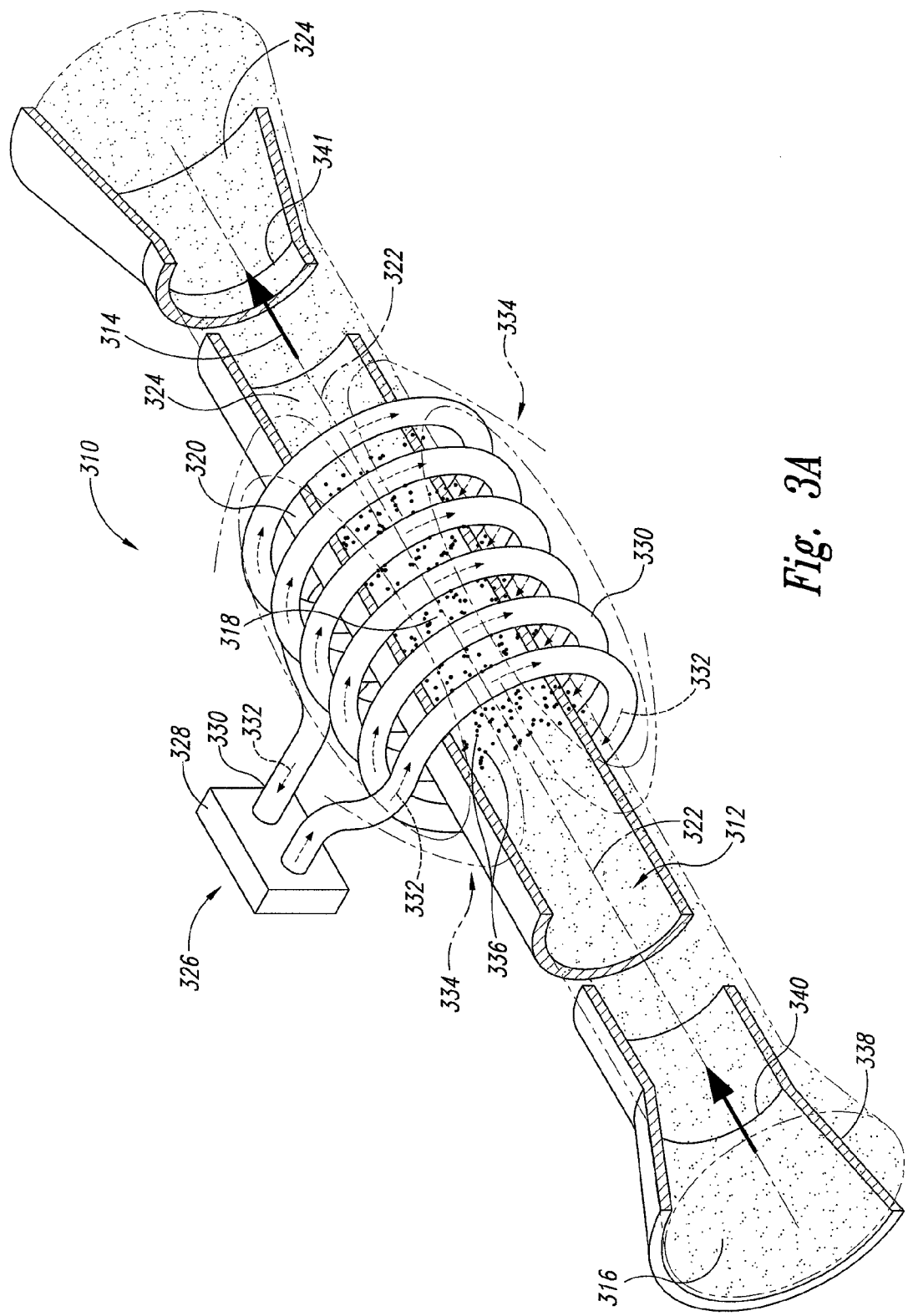
FIG. 3A shows a side perspective view of a "dynamic" supercritical fluid biomass conversion system in accordance with an embodiment of the present invention, wherein an alternating electrical current is passing through an induction coil so as to generate a transverse alternating magnetic field.
Figure 3B:
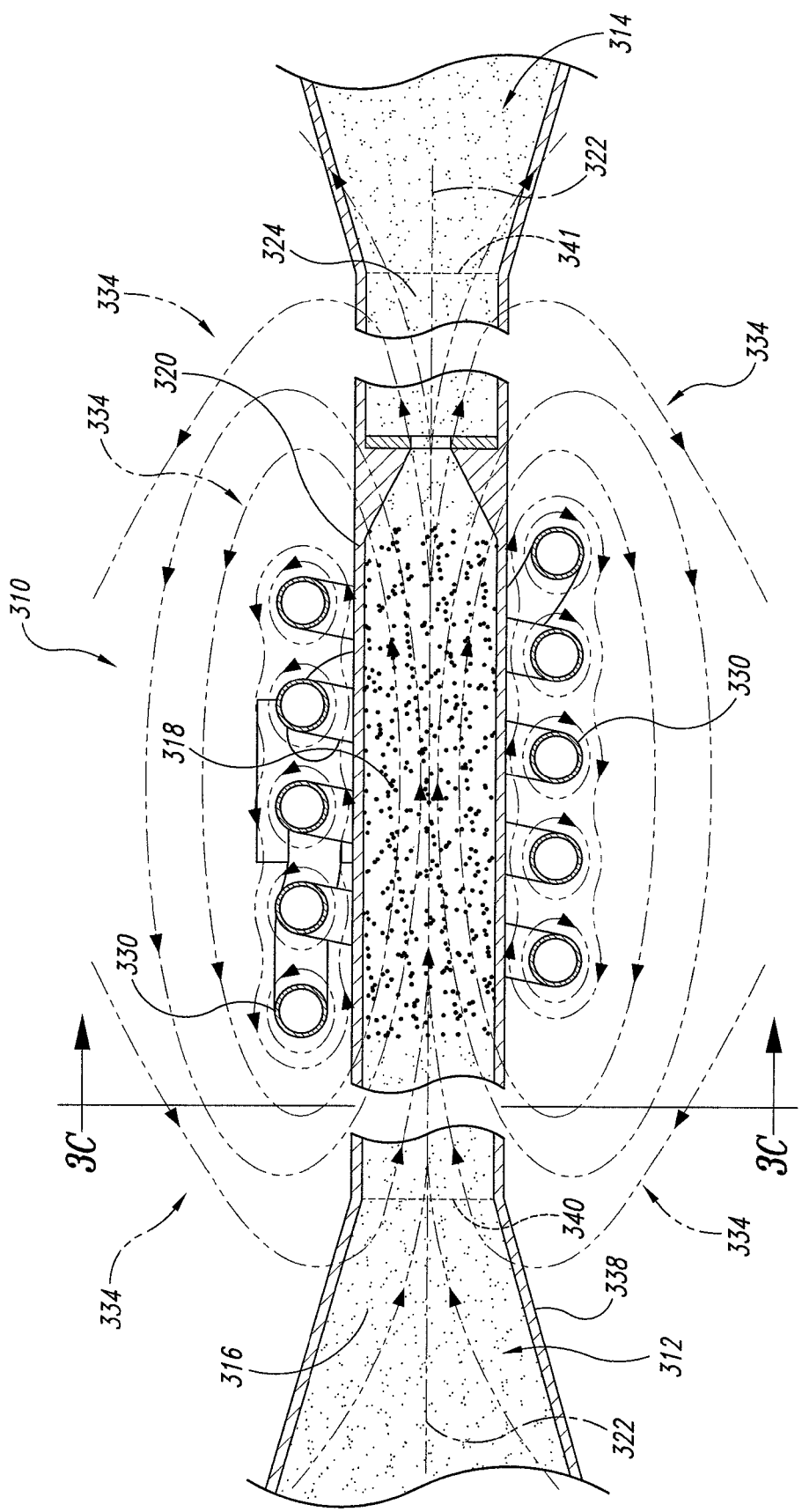
FIG. 3B shows a side cross-sectional view of the supercritical fluid biomass conversion system shown in FIG. 3A.
Figure 3C:
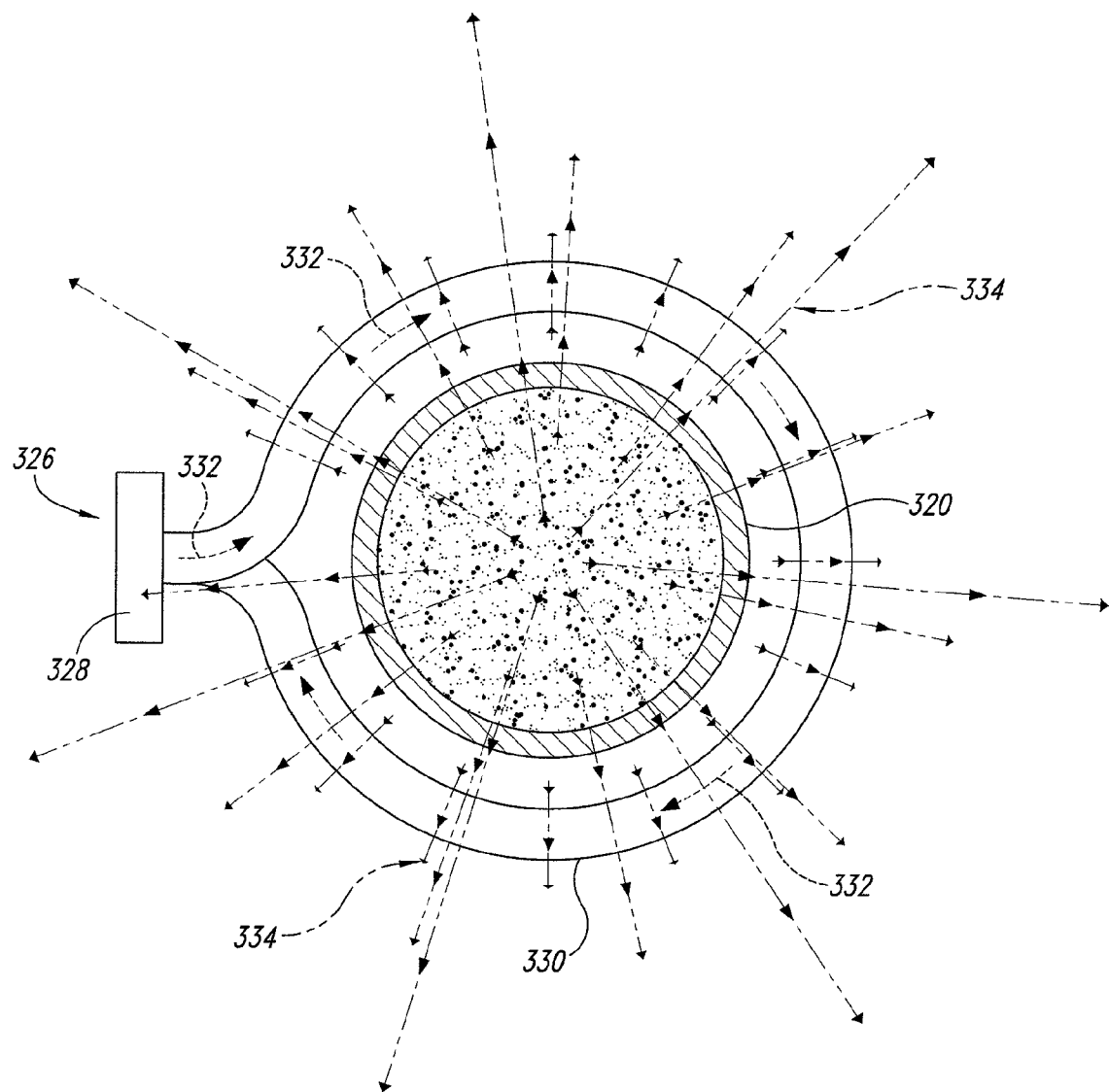
FIG. 3C shows an end view of the supercritical fluid biomass conversion system shown in FIGS. 3A and 3B.

In another embodiment and as shown in FIGS. 3A-C, the present invention is also directed to a "dynamic" supercritical fluid biomass conversion system 310 for continuously converting a selected biomass flowstream 312 into a plurality of reaction products 314, and comprises, in fluidic series: a biomass conveying zone 316; a supercritical fluid biomass conversion zone 318 within an electrically conductive housing 320 and about a central axis 322; and a reaction product quenching/separation zone 324. The supercritical fluid biomass conversion system 310 may be characterized in that it further comprises an induction heating system 326 that includes an alternating current power supply 328 electrically connected to an induction coil 330. As shown, the induction coil 330 is concentrically positioned about the central axis 322 and the electrically conductive housing 320 of the supercritical fluid biomass conversion zone 318. The induction coil 330 is configured to pass therethrough an alternating electrical current 332 that simultaneously generates a transverse alternating magnetic flux (schematically depicted as spaced apart magnetic field lines 334). As further shown, the alternating magnetic flux passes through and resides within at least a portion of the supercritical fluid biomass conversion zone 218.

As shown, the biomass conveying zone 316 is positioned within a conveying section housing 338 fluidicly connected to the supercritical fluid biomass conversion zone housing 320, wherein the biomass material 312 that is flowing within the biomass conveying zone 316 (1) funnels into the supercritical fluid biomass conversion zone 318 by way of one or more inlet orifices 340, and (2) funnels out of the supercritical fluid biomass conversion zone 318 and into the quenching/separation zone 324 by way of one or more outlet orifices 341. Each inlet orifice 340 may define a converging nozzle. Similarly, each outlet orifice 340 may define a diverging nozzle. Thus, the electrically conductive housing 320 that surrounds the biomass conversion zone 318 defines a converging-diverging nozzle.

The supercritical fluid biomass conversion system 310 may in certain embodiments further comprise a plurality of electrically conductive particles 336 dispersed throughout the selected water laden biomass material. In this way, the selected biomass material together with water and the plurality of electrically conductive particles are capable of flowingly passing through the supercritical fluid biomass conversion zone 316. In so doing, the plurality of electrically conductive particles are heated by means of electromagnetic induction as a result of passing through the alternating magnetic field (thereby facilitating heat transfer throughout the biomass material). The plurality of electrically conductive articles may comprise a metal, an alloy, coal, graphite, and the like.

Thus, and in other embodiments, the present invention is also directed to a composition of matter that consists essentially of a mixture of a biomass material, water, and a plurality of electrically conductive particles capable of being inductively heated when under the influence of an alternating magnetic field, wherein the water component of mixture is at a supercritical state. The biomass material may be in an amount ranging from about 10 to about 88 percent by weight, the water may be in an amount ranging from about 12 to about 90 percent by weight, and the plurality of electrically conductive particles may be in an amount of less than about 1 percent by weight. Alternatively, the biomass material may in an amount ranging from about 30 to about 60 percent by weight, the water may be in an amount ranging from about 40 to about 70 percent by weight, and the plurality of electrically conductive particles may be in an amount of less than about 5 percent by weight. The electrically conductive particles are preferably substantially spherical in shape and preferably have diameters in the range of about 5 to about 500 microns.

Figure 4A:
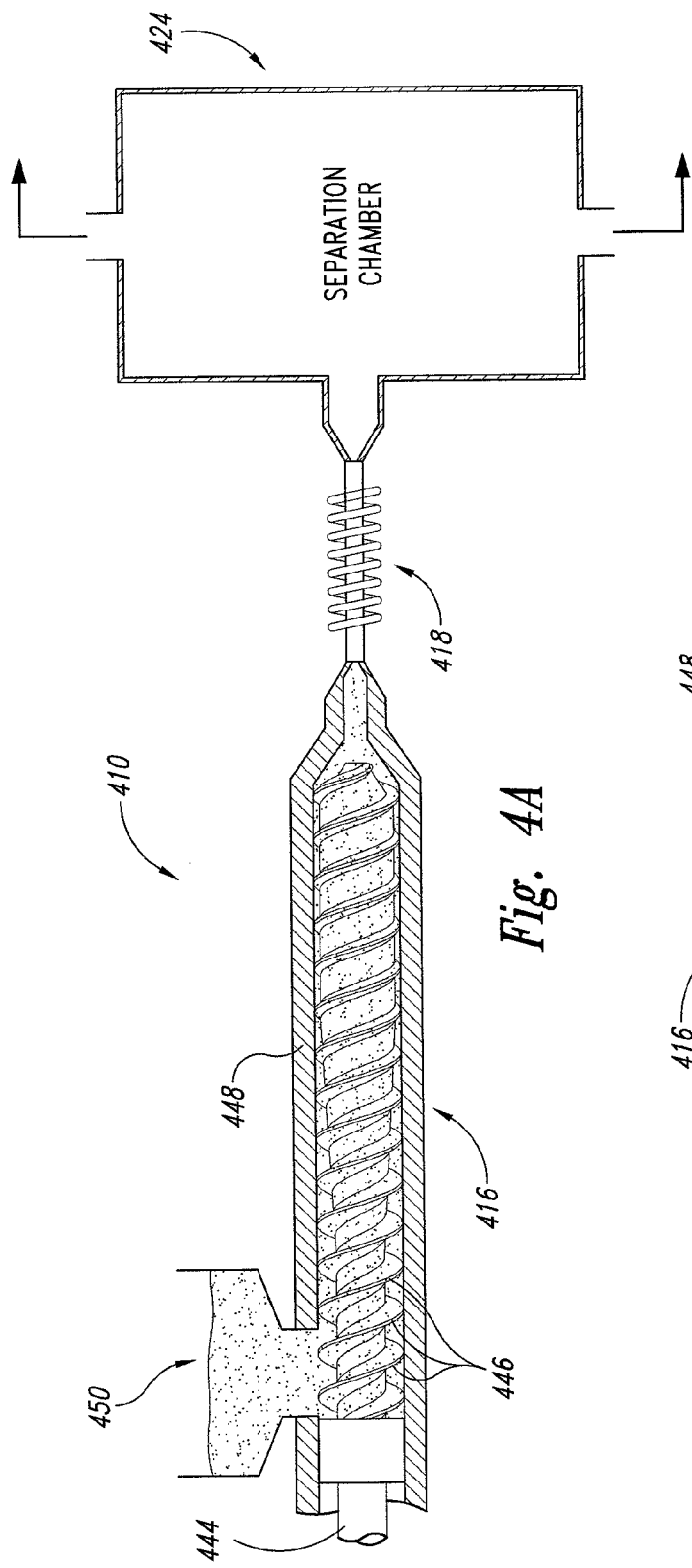
FIG. 4A shows a side elevational cross-sectional view of an extruder-fed induction-heated supercritical fluid biomass conversion system in accordance with an embodiment of the present invention.
Figure 4B:
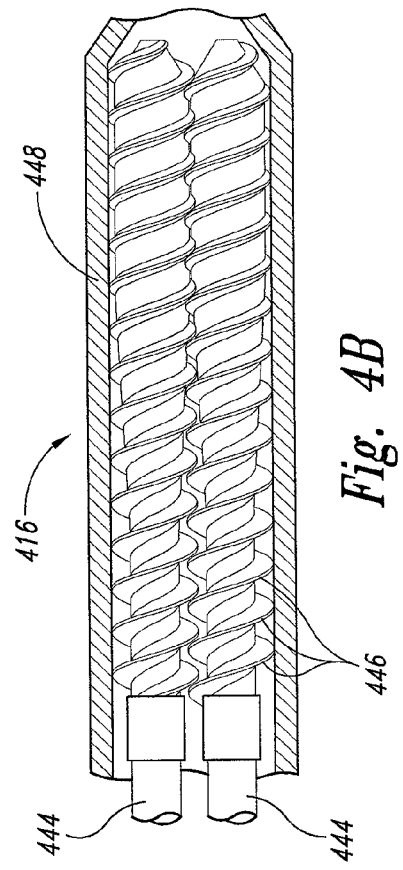
FIG. 4B shows a top cross-sectional view of the extruder section of the extruder-fed induction-heated supercritical fluid biomass conversion system shown in FIG. 4A.

In yet another embodiment and as shown in FIGS. 4A-B, the present invention is also directed to an extruder-fed induction-heated supercritical fluid biomass conversion machine/system 410 that comprises, in fluidic series: an elongated biomass conveying zone 416; a supercritical fluid biomass conversion zone 418; and a reaction product quenching/separation zone 424. In this embodiment, the elongated biomass conveying zone 416 contains two or more elongated rotatable shafts 444 having a plurality of flighted screws 446 positioned lengthwise within an elongated conveying section housing 448. The plurality of flighted screws 446 are positioned about each respective two or more elongated rotatable shafts 444, which shafts are configured to continuously convey the selected biomass material (not shown) from an upstream biomass inlet 450 to the supercritical fluid biomass conversion zone 418 while increasing the pressure of the selected biomass material from about atmospheric at the biomass inlet 450 to greater than about 22.1 MPa at the supercritical fluid biomass conversion zone 418. Each of the pair of intermeshing extruder screw elements may be tapered with the fat end being positioned adjacent to the supercritical fluid biomass conversion zone 418. Each fat end of each extruder screw element may include a cone section configured to coaxially fit within the one or more funnel shaped orifices that feeds into the supercritical fluid biomass conversion zone 418.

In this embodiment, the two or more elongated rotatable shafts 444 having a plurality of flighted screws 446 define a pair of intermeshing extruder screw elements. The intermeshing extruder screw elements may be either co-rotatable or counter rotatable. In addition, the pair of intermeshing extruder screw elements further defines a plurality of discrete C-shaped chambers positioned lengthwise about each of the pair of intermeshing screw elements.

Figure 5:
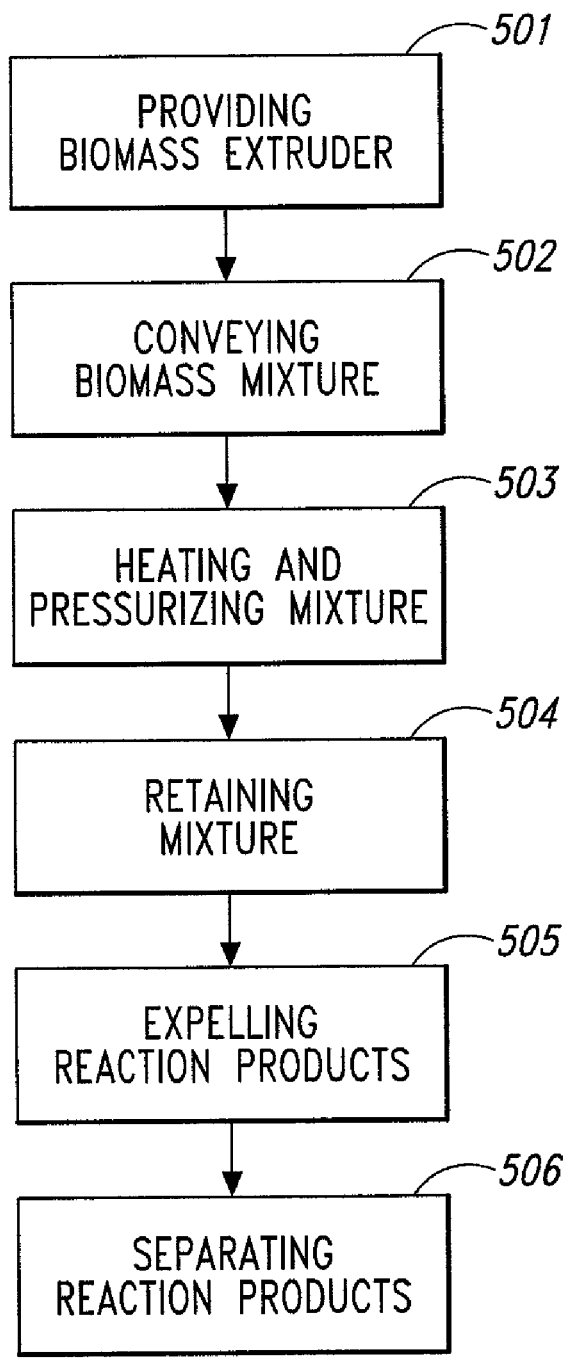
FIG. 5 is a block diagram of a method for making a plurality of reaction products from a selected biomass material in accordance with an embodiment of the present invention.

The present invention is also directed to a method for converting a selected biomass material into a plurality of reaction products. As shown in FIG. 5, the method comprises the steps of: providing 501 an elongated biomass conveying zone that contains two or more elongated rotatable shafts having a plurality of flighted screws positioned lengthwise within an elongated conveying section housing, wherein the plurality of flighted screws are positioned about each respective two or more elongated rotatable shafts, and wherein the two or more elongated rotatable shafts are configured to continuously convey the selected biomass material together with water from an upstream biomass inlet to a supercritical fluid biomass conversion zone while increasing the pressure of the selected biomass material and water from about atmospheric at the biomass inlet to greater than about 22.1 MPa at the supercritical fluid biomass conversion zone; conveying 502 a mixture of the selected biomass material and water through the elongated biomass conveying zone and into the supercritical fluid biomass conversion zone; heating and further pressurizing 503 the mixture within the supercritical fluid biomass conversion zone to yield at least supercritical water, wherein heat energy is supplied by means of an induction heating coil positioned circumferentially about the supercritical fluid biomass conversion zone; retaining 504 the mixture within the supercritical fluid biomass conversion zone for a period of time sufficient to yield the plurality of reaction products; expelling 505 the plurality of reaction products out of the supercritical fluid reaction zone and into a quenching/separation zone; and separating 506 the plurality of reaction products into at least a water soluble fraction and an organic solvent soluble. In this method, the period of time that the mixture is retained within the supercritical fluid biomass conversion zone generally ranges from about 0.4 to about 10 seconds. This method may also comprises the further steps of adding a phenolic compound 507 to the plurality of reaction products to thereby retard the formation of certain degradation reaction products, as well as a step of adding a plurality of electrically conductive particles 508 to the mixture of the selected biomass material and water such the plurality of electrically conductive particles are heated while passing through the induction coil.

Finally, and for purposes of efficient heat transfer across the flowing biomass fluid stream, it is contemplated that a suitable heat transfer agent such as, for example, a heavy petroleum oil or oil shale, a waste synthetic plastic exemplified by polyethylene, polystyrene or polyethylene terephthalate or a recyclable low melting metal (tin, mp 232° C. or lead, mp 327° C.) or metal alloy, preferably Wood's metal (an alloy of Bismuth 50%, Cadmium 12.5%, Lead 25% and Tin 12.5%, mp 73-77° C.) may be added to biomass feedstock prior to its introduction into the co-rotating twin screw extruder.

For purposes of illustration and not limitation, the following example more specifically discloses certain exemplary test materials, methods, and results associated with a supercritical fluid biomass conversion systems made in accordance with the present invention.

EXAMPLE

We, the inventors of the various embodiments disclosed herein, conceived, designed, built, and successfully tested the world's first electromagnetic induction heated supercritical fluid biomass conversion machine. In this regard, our novel biomass conversion machine validates our concept of rapidly converting selected biomass materials into a plurality of reaction products including glucose (and other fermentable sugars) and various aromatic compounds that, in turn, are readily convertible into liquid motor fuel; namely, "cellulo-ethanol" and "ligno-diesel," respectively. To this end and for purposes of validation, we built a series of cylindrical shaped stainless steel (15-5 SST) pressure vessels having wall thicknesses of about 0.062 inches (as shown and described in the engineering drawings denoted as FIGS. 4A-F) and having an internal volume of about 3.0 ml. We also acquired an electromagnetic induction heating system (model SP-16A Induction Heater available from MTI Corporation, U.S.A.), and specially modified it such that it would, among other things, horizontally retain each pressure vessel under test within a closely wound (5 turns) helical induction coil made of ¼ inch copper tubing. Each fully loaded pressure vessel was then subjected to a time-variable magnetic field by energizing the induction coil with alternating electric current that ranged from about 50-100 KHZ for a period of time ranging from about 2 to 5 seconds. After energizing, each vessel was rapidly cooled by way of quenching with a cascading flowstream of water. In our experimental set-up, we were able to completely liquefy a water laden solid hardwood into a yellowish brown liquid mixture that felt slippery and oily indicating that we had indeed achieved a biomass transformational success!

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for converting a selected biomass material into a plurality of reaction products, the method comprising the steps of:
   providing an extruder that defines an elongated biomass conveying zone, wherein the extruder comprises two or more elongated rotatable flighted shafts positioned in a side-by-side and intermeshing relationship, and wherein the extruder is configured to continuously convey the selected biomass material together with water from an upstream biomass inlet to a supercritical fluid biomass conversion zone while increasing the pressure of the selected biomass material and water from about atmospheric at the biomass inlet to greater than about 22.1 MPa at the supercritical fluid biomass conversion zone;
   conveying a mixture of the selected biomass material and water through the elongated biomass conveying zone and into the supercritical fluid biomass conversion zone;
   heating and further pressurizing the mixture within the supercritical fluid biomass conversion zone to yield at least supercritical water, wherein heat energy is supplied by means of an induction heating coil positioned circumferentially about the supercritical fluid biomass conversion zone;
   retaining the mixture within the supercritical fluid biomass conversion zone for a period of time sufficient to yield the plurality of reaction products; and
   expelling the plurality of reaction products out of the supercritical fluid reaction zone and into a reaction products separation zone.

2. The method of claim 1 wherein the period of time ranges from about 0.4 to about 10 seconds.

3. The method of claim 1, further comprising conveying a plurality of electrically conductive particles along with the mixture of the selected biomass material and water such that the plurality of electrically conductive particles are heated while passing through the induction coil.

4. The method of claim 1, further comprising conveying a heat transfer agent along with the mixture of the selected biomass material and water such that heat transfer agent is heated while passing through the supercritical fluid biomass conversion zone.

5. The method of claim 4 wherein the heat transfer agent is an oil, a metal alloy, or a combination thereof.

* * * * *